July 21, 1925.

J. E. PRITCHETT 1,546,455

MECHANICAL BELL RINGER

Filed July 16, 1921    2 Sheets-Sheet 1

J. E. Pritchett,

INVENTOR.

BY Donald H. Rich

ATTORNEY

Patented July 21, 1925.

1,546,455

UNITED STATES PATENT OFFICE.

JAMES E. PRITCHETT, OF ROANOKE, VIRGINIA.

MECHANICAL BELL RINGER.

Application filed July 16, 1921. Serial No. 485,272.

*To all whom it may concern:*

Be it known that I, JAMES E. PRITCHETT, a citizen of the United States, residing at Roanoke, in the county of Roanoke and State of Virginia, have invented certain new and useful Improvements in Mechanical Bell Ringers, of which the following is a specification.

This invention relates to improvements in mechanical bell ringers such as are especially designed for use in connection with locomotives or steam engines of the stationary type, but is applicable to any type of engine and capable of being efficiently operated by any motive fluid.

One object of this invention is to provide a bell ringer of exceptional simplicity and durability and capable of being easily and inexpensively manufactured.

A further object of this invention is to provide a device of the above mentioned character operated by fluid under pressure, the several parts of which function perfectly under all conditions with a minimum amount of waste of the motive fluid.

A still further object of this invention is to provide a fluid pressure operated bell ringer pivotally connected with the bell and bell support so that a direct thrust of the operative parts of the device is obtained during the operation thereof, thus eliminating or reducing to a minimum, the frictional wear on the several parts.

The above and other objects of this improvement will fully appear in the course of the following description, taken in connection with the accompanying drawings and be explicitly defined in the appended claim. I desire it understood, however, that this disclosure is illustrative only and that the principle of this invention can be embodied in constructions other than the one specified herein within the scope of the appended claim without departing from the spirit of the invention.

Figure 1:
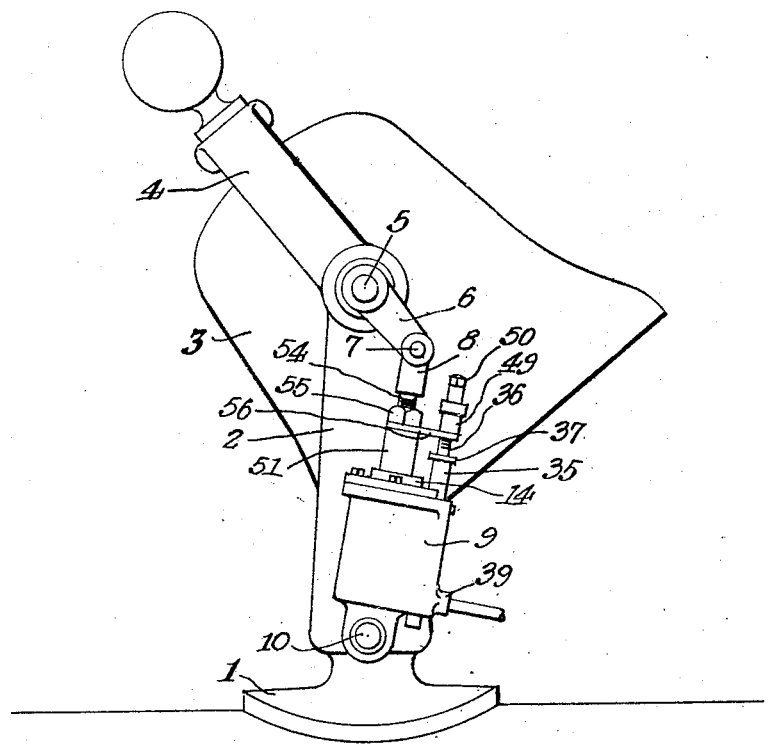
Figure 2:
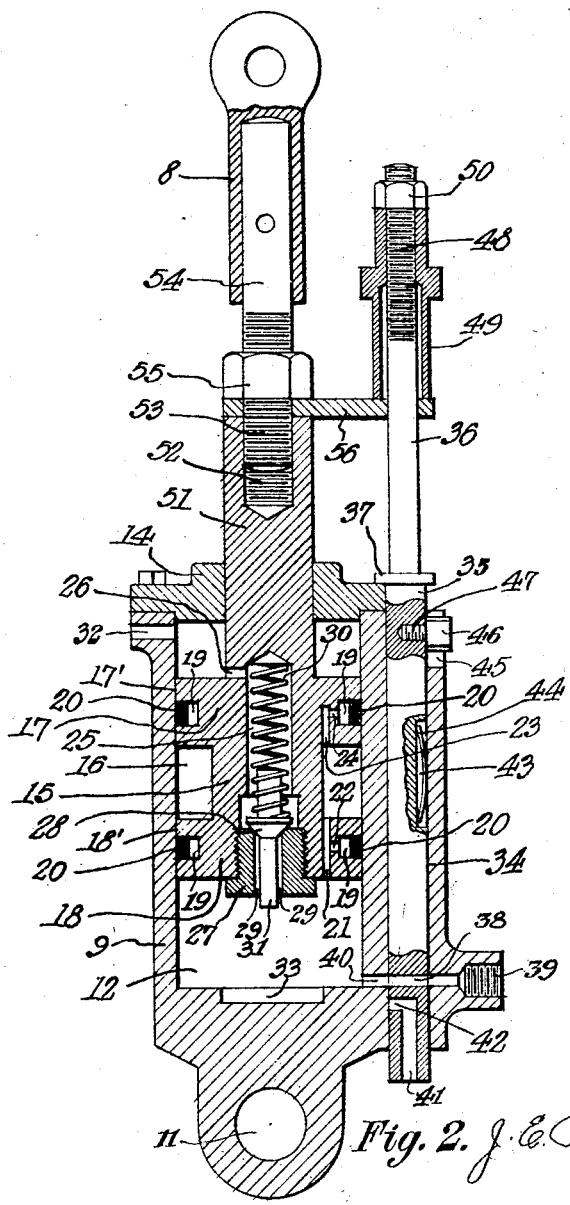

In the drawings wherein similar characters of reference denote similar parts in the several views, Figure 1 is a side elevation of the device in position upon the boiler of a locomotive and connected to the bell, and Fig. 2 is a vertical sectional view of the device.

Referring now, more particularly to the drawings, 1 designates the support for a bell-frame 2, said support 1, being secured to a locomotive in the usual manner.

A bell 3 is mounted in the bell trunnion 4, said trunnion being supported by shafts 5; the bell being capable of swinging in the usual manner.

Rigidly connected to one of the shafts 5, and depending therefrom is a pitman 6, the free end of which is pivotally connected at 7 to a tubular sleeve 8.

All of the parts above mentioned are old in the art to which this invention appertains, and no individual claim is made to the subject matter thereof, the showing being for illustrative purposes only.

The device embodying the present invention comprises a casing 9 which is pivotally connected at 10, to the bell-frame 2, a suitable opening 11 in said casing being provided for this purpose.

Referring now to Fig. 2 of the drawings, wherein are shown in detail, the several features of this invention, it can be seen that the casing 9 is provided with a piston chamber 12 provided with a closure cap 14 which latter may be bolted or otherwise secured thereto.

A piston 15 is slidably mounted in chamber 12, said piston having a relatively large groove 16 intermediate its ends, forming a lubricant chamber; thus providing in reality a piston having two sections 17 and 18 respectively each having a wearing face 17' and 18', respectively. An annular groove 19 is provided in each of the wearing faces 17' and 18', each having positioned therein a packing ring 20 formed of leather or other suitable, like material. It can be seen that these packing rings 20 do not fully occupy the grooves 19, the object of which will be hereinafter described. The grooves 19 are in communication with piston chamber 12 and lubricant chamber 16 by means of a port 21 extending through section 18 of the piston, and communicating with groove 19 therein through a port 22; and port 23 extending partly through piston section 17 and communicating with groove 19 therein through a port 24.

The piston 15 is tubular as shown at 25, same serving as a port, which communicates with port 26 leading to the upper portion of chamber 12, above said piston 15, the function of which construction will be hereinafter described. The lower portion of port 25 is enlarged and screw threaded to receive a tubular valve seat 27, provided with a valve 28 which controls the port 29 in said seat. This valve 28 is normally retained against said valve seat 27 by a spring 30 positioned in port 25.

The valve 28 is provided with a depending stem 31 which extends below the lower face of valve seat 27. It can be seen that fluid under pressure may pass from the lower part of chamber 12 through ports 29, 25, and 26 to the upper portion of chamber 12 and thence to the atmosphere through a port 32.

A recess 33 is provided in the casing 9 at the bottom of chamber 12, said recess being of such size as to accommodate the base of valve seat 27, the purpose of which will be presently described.

The casing 9 is provided with a vertically arranged valve opening 34 extending therethrough, adjacent to piston chamber 12, within which valve opening is slidably mounted a valve stem 35 having an upper reduced end 36 and a boss 37, the latter being so positioned as to contact with cap 14 of chamber 12 to limit the downward movement of said stem.

The lower portion of said stem 35 is provided with a port 38 extending transversely therethrough and capable of communicating with a motive fluid inlet 39 and a port 40 from chamber 12 through casing 9 at the lowermost portion of the latter.

The lower portion of valve stem 35 is further provided with a vertically arranged port 41 leading to the atmosphere and a transverse port 42 communicating therewith, the latter being capable of registering with port 40, just mentioned upon sufficient vertical movement of said valve stem.

The valve stem 35 is provided with a vertical groove 43 in which is loosely mounted a bow spring 44 which contacts with the interior wall of the valve opening and serves to support the valve stem 35 in any one of several vertical positions that it may assume within the opening 34, in an obvious manner.

The upper portion of the casing 9, adjacent valve opening 34 is slotted as shown at 45, serving as a guideway for the slidable reception of head 46 of a pin 47 which is secured within the valve stem 35 to prevent rotation of the latter.

The reduced end 36 of valve stem 35, is screw threaded at 48 and is provided with a sleeve 49, which may, if desired, and preferably is, screw threaded, and hence, vertically adjustable on reduced end 36 of the valve stem. Mounted at the free end of stem 36 is a lock nut 50 for retaining the sleeve 49 in any desired position on said stem, or in case said sleeve is loosely mounted on said stem, to limit the upward movement of said sleeve upon the operation of the device.

The piston 15 in chamber 12 is provided with a piston rod 51, preferably formed integral therewith, which extends upwardly through an opening in the cap 14, and is provided at its end with an interiorly screw threaded portion 52, which receives the exteriorly screw threaded portion 53 of a rod 54 whose free end is received, and loosely mounted within sleeve 8, hereinbefore described.

Secured to the free end of piston rod 51 and retained in position by a nut 55 is a plate or lug 56, the outer end of which encircles and is slidably mounted on the valve stem portion 36, said lug 56 serving as a valve actuating means as will be presently set forth.

The operation of the device is as follows: When the piston 15 is in its lowermost position, i. e. resting upon the base of chamber 12, and it is desired to ring the bell 3, which is "at rest," the valve stem 35 is in its lowermost position, port 38 registering with port 40.

Fluid under pressure is admitted through 39, 38, and 40, to the interior of the chamber 12, whereupon the piston 15 will be raised thereby, forcing the piston rod 51 upwardly, said piston rod forcing sleeve 8, connected to the pitman 6, upwardly in an arc, rotating the bell to some extent and the bell clapper (not shown) will strike the bell. It is to be noted at this point that due to the pivotal mounting of the casing 9, there will be a direct thrust upon the end of pitman 6 by the end of sleeve 8 and its coacting piston rod. This feature is especially important in that the wear commonly incident to rigidly secured casings is eliminated.

When the piston rod has reached a predetermined point, same being obtained by the adjustment of the nut 50 and the sleeve 49 on valve stem section 36, the lug or plate 56 will raise the valve stem 35 by its contact with the lower end of the sleeve 49 thereby forcing port 38 out of register with port 40 and cutting off the admission of motive fluid to chamber 12, and place port 42 and its associated port 41, into registry with port 40.

The bell 3 will return to the "at rest" position by gravity, and on its return, the sleeve 8 will force the piston rod 51 downwardly, thus forcing the piston toward the lower end of chamber 12, the fluid in said chamber beneath the piston, being exhausted through ports 40, 42 and 41 to the atmosphere.

When the piston 15 has substantially reached the bottom of chamber 12, the lug 56 will contact with boss 37, and thus force valve stem 35 downwardly in valve opening 34, forcing port 42 out of register with port 40, and again placing ports 38 and 40 in register with each other; when the above mentioned operation will be repeated unless the operator has cut off the flow of motive fluid.

Upon the return of piston 15 to the bottom of chamber 12, the valve seat 27 will seat in the recess 33, whereupon the valve 28 will be raised from its seat due to the contacting of valve stem 31 with the bottom of the recess 33 assisted also by the compression of motive fluid remaining beneath the piston 15 which has not possibly, been exhausted through exit port 41 to the atmosphere. The construction of the valve 28, it is to be understood, is such that the tension of the spring 30 is such as to withstand the pressure of the injected motive fluid, but is insufficient to withstand the weight of the bell 3 as it forces the piston down into the chamber 12 by gravity. As the valve 28 is raised, any excess motive fluid (same obviously being still under pressure) remaining in the chamber 12 below the descending piston is exhausted through ports 29, 30, 19 and 32 to the atmosphere.

A suitable lubricant is placed in the lubrication chamber 16 of the piston 15 and it will be obvious that this lubricant is retained within the chamber to a great extent by the pressure of the motive fluid at all times. As said motive fluid is injected into chamber 12, some of it will pass through port 21 of section 18′ of the piston, thence through port 22 to annular groove 19 of said section. Other fluid will pass entirely through port 21 to chamber 16 and thence through ports 23 and 24 to the annular groove 19 of section 17′. The pressure of the motive fluid in the several parts just mentioned will serve to retain the lubricant in the lubricant chamber and in the annular grooves 19, as will be obvious, due to the fact that there will constantly be a pressure of motive fluid within these several parts. This pressure has been found under ordinary working conditions to be sufficient to retain the lubricant within the spaces above mentioned for a considerable length of time.

It is to be understood that the chamber 16 may not be supplied with lubricant, if desired, as the device is perfectly operative by merely lubricating the packing rings 20, which upon pressure of the motive fluid will be kept moist and further compensated for wear.

The invention further provides an adjustable feature which permits the bell to be rung at various constant intervals. The sleeve 49 may be retained in various predetermined positions on the valve stem section 36 where it may permit of its engagement by the lug 56 at various intervals thereby changing the time of registry of the several ports 38, 41 and 42 with port 40 leading to the chamber 12.

The device embodying this invention can be reversed in position should occasion desire or circumstances compel, by changing, or reversing the position on the pivot 10.

In reduction to practice, I have found that the form of my invention illustrated in the drawings and referred to in the above description as the preferred embodiment is the most efficient and practical, yet realizing that the conditions concurrent with the adoption of the device will necessarily vary, I desire to emphasize the fact that various changes in construction and arrangement of parts may be resorted to, when required, without sacrificing any of the advantages of my invention as defined in the appended claim.

Having thus described the invention, what I claim as new and desire to secure by Letters Patent of the United States is:

A bell ringer of the class described comprising a casing having a recess in its lower portion and a port in its upper portion, a piston in said casing and provided with an opening extending therethrough, a piston rod secured to said piston, a valve within said piston, an adjustable valve seat for said valve, spring means for retaining said valve in contact with said seat, a second valve mounted in said casing, and provided with ports for permitting ingress and egress of motive fluid beneath said piston, and means connected with said piston for controlling the movement of said second valve, the first named valve being provided with a stem extending below the lower face of said piston and adapted to contact with the interior of the casing whereby to unseat said valve when said piston is in its lowermost position to permit the escape of trapped motive fluid through said piston and to the atmosphere through the port in said casing.

In testimony whereof, I hereby affix my signature.

JAMES E. PRITCHETT.